March 22, 1966  C. J. GRIMLAND  3,241,514
PNEUMATIC PRESSURE INDICATOR
Filed Oct. 12, 1964

INVENTOR
CHARLES J. GRIMLAND

BY *Alexander & Dowell*

ATTORNEYS

United States Patent Office 3,241,514
Patented Mar. 22, 1966

3,241,514
PNEUMATIC PRESSURE INDICATOR
Charles J. Grimland, Garland, Tex., assignor to The Geotechnical Corporation, a corporation of Delaware
Filed Oct. 12, 1964, Ser. No. 403,088
8 Claims. (Cl. 116—70)

This invention relates to an improved inexpensive indicator for showing the presence of pneumatic pressure at an output port which the indicator itself plugs, this device being especially useful in connection with pneumatic digital and binary circuitry.

Pneumatic circuitry has certain advantages over electronic circuitry especially in outer space instruments because of the fact that it is unaffected by radiation which has a tendency to upset the function of the electronic circuitry. Pneumatic circuitry also has the advantage of ruggedness and simplicity enhancing its use in connection wtih automated machine tool control, navigational instruments, and computer-type instruments. This type of instrumentation generally operates on relatively low pressures, for example as low as 3 p.s.i. and sometimes extending above 40 or more p.s.i.

It is the object of the present invention to provide a very low-cost indicator for indicating the presence or absence of pressure within a selected branch of a system, the indicator being extremely small and light-weight, and so inexpensive that a large number of them can be used economically in a system.

Another important object of the invention is to provide a pressure indicator which is sensitive to the presence of pneumatic pressures which are only slightly different from atmospheric.

It is another object of the invention to provide a simple pressure indicator which can be observed and read through a large angular field, the pressure indicator providing good visibility through a small transparent dome which appears to change color when the output to which it is connected is pressurized, such change of color also being apparent when viewed through a large range of incident angles.

Another object of the invention is to provide a very inexpensive pressure indicator which can signal its own failure by leakage of pressure through a small vent in front of its dome.

Still a further object of the invention is to provide a simple panel-mounted bushing to which a pressure hose can be connected on one side and having on the other side a nipple to which the pressure indicator dome can be applied by simply plugging the dome onto the nipple. This combination provides an excellent temporary plug for an output port, which also shows the presence or absence of pressure. When the system is functioning satisfactorily, the indicator plugs the port and shows the presence of pressure thereat. If the system develops trouble, so that it functions in a less-than-optimum manner, the same pressure dome can be unplugged from the nipple and a precision pressure gauge can be substituted therefore to provide a more accurate quantitative pressure reading. In a system including a large number of pressure indicators according to the present invention, these indicators provide very convenient plugs for closing the various pressure-test ports.

Another important object of the invention is to provide a quick-change pressure indicator in which the color of the indication can be easily changed by merely unplugging one indicator and plugging another one into the same nipple, the same procedure making it easy to select the pressure dome colors used in order to color-code pressure outlets having the same operating pressure levels.

Other objects and advantages of the invention will become apparent during the following discussion of the drawings, wherein.

Figure 1:
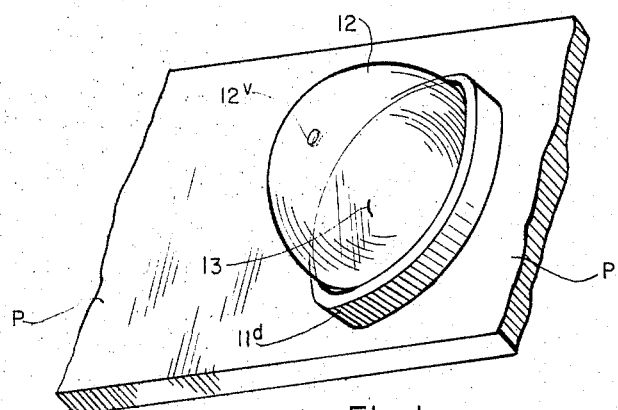
FIG. 1 is a perspective view showing a pressure indicator according to the present invention mounted on the front panel of an instrument.

Referring now to the drawing, the pressure indicator may be conveniently mounted upon the panel P of an instrument employing a bushing portion 1 having a flange 2 adapted to seat upon the panel P, and held in place thereon by a suitable fastening such as a nut 3 co-operating with threads 4 upon the stud portion of bushing 1. Other types of non-threaded fasteners can, of course, be substituted for the nut 3. The bushing includes a hollow stem 5 enlarged at its outer end 5a and adapted to receive a pressure hose H which can be slipped over the bushing and maintained thereon in any well-known manner. The other end of the bushing 1 includes a nipple 6 having an enlarged outer end 6a, this nipple receiving the pressure dom portion 10 which is held thereon by the resilient grip of the materials of which these parts are made, as will be discussed below.

The pressure dome portion 10 includes an elastic body 11 having an enlarged bore 11a to clear the flange 2 and having a restricted bore 11b sized to be a snug fit upon the smaller-diameter portion of the nipple 6. The body 11 also has an enlarged bore 11c which forms a shoulder where it meets the small bore 11b, and this shoulder catches upon the enlarged end 6a of the nipple and resists accidental disengagement of the dome portion 10 of the indicator. The bore 11a–11b–11c extends all the way through the body 11.

The dome itself comprises a hemispherical transparent member 12 preferably made of clear plastic or glass, the dome having a vent 12v at its top and having a cylindrical portion 12a terminating in a small flange-like enlargement 12b. The body 11 has a lip portion 11d shaped to receive the cylindrical portion 12a and the flange-like portion 12b of the member 12. The body 11 is made of a resilient deformable material such as rubber or vinyl or polyethylene plastic, or any other suitable deformable material having an elastic memory such that the lip portion 11d will snuggly grip the flange portion 12b of the dome, to hold it in place.

The resilience of the body 11 is also used to provide a plug-on cooperation between the pressure-indicator dome portion 10 and the bushing portion 1. Between the body 11 and the pressure dome 12 two rubber diaphragms 13 and 14 are captivated, by pinching them between the cylindrical portion 12a of the pressure dome 12 and the body 11 in the manner shown in FIG. 2. These diaphragms are made of a very thin rubber film of the type of which toy balloons are made, but the diaphragm 13 is a different color than the diaphragm 14. It is well-known in the balloon art that when a balloon is inflated, it is very much more translucent, nearly transparent, than when it is deflated. Some of the prior art balloon patents use this feature for ornamental purposes, as shown for instance in Patents 1,567,132 and 2,295,708.

Figure 2:
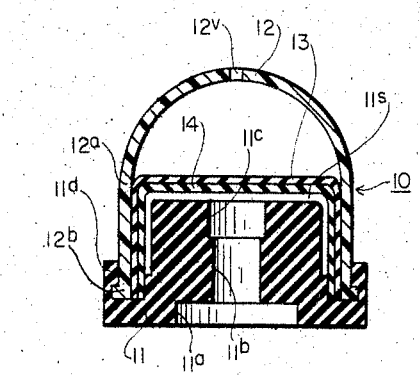
FIG. 2 is a cross-sectional view of the pressure dome portion of the indicator in unpressurized position.

This same general phenomenon is used to indicate pressure in the present structure. When the diaphragms are deflated as shown in FIG. 2, the color of the outer diaphragm 13 is dominant. However, when fluid pressure is applied within the bore 11c, the diaphragms 13 and 14 are stretched outwardly so that they lie against, and are confined by, the transparent dome 12 which is provided with a vent 12v to permit air within the dome to escape as the diaphragms are inflated outwardly. The inner diaphragm 14 is then tightly pressed against the stretched outer diaphragm 13. The vent 12v also provides indication of failure in the event that the diaphragms should rupture, since a small amount of air will hiss from the vent 12v under such circumstances. The body has a few outwardly-extending slots such as the slot 11s, which slots tend to distribute the air radially beneath the diaphragm 14.

Since the outer diaphragm 13 is stretched, it is semi-transparent, and will show a color which is modified by the color of the inner diaphragm 14. For instance, if the outer diaphragm 13 is white and the inner diaphragm 14 is bright red, the color seen through the dome 12 will appear to be almost white in the uninflated indicator position as shown in FIG. 2, but the color seen through the transparent dome 12 will be pink when the diaphragms are inflated and stretched outwardly as shown in FIG. 4 because the red color of the diaphragm 14 will show through the stretched white diaphragm 13.

Figure 4:
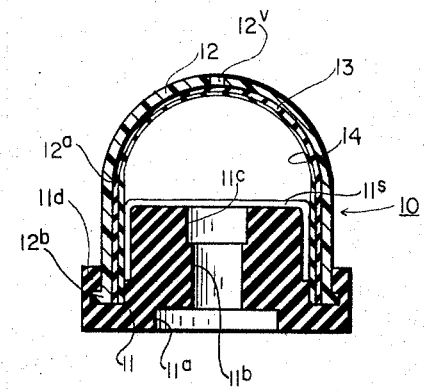
FIG. 4 is a view similar to FIG. 2, but showing the indicator dome in pressurized position.
Figure 3:
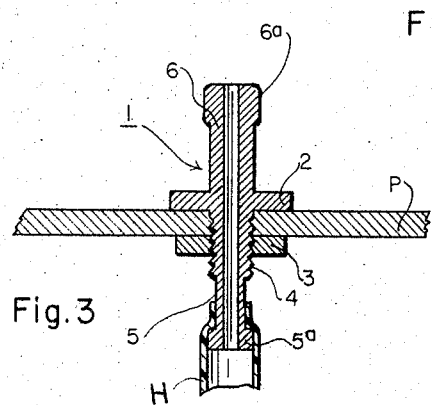
FIG. 3 is a cross-sectional view taken through the mounting bushing portion of the indicator.

Another example would be a yellow outer diaphragm 13 covering a blue diaphragm 14 which would provide a substantially yellow indication in the absence of internal pressure as shown in FIG. 2, but a green indication signalling the presence of pressure in the diaphragm position shown in FIG. 4. In this way, the present indicator provides not only a change-of-position indication as suggested in Patent 3,111,930, but also a striking change-of-color indication.

The present invention is particularly inexpensive to manufacture since it includes only three molded parts, two rubber diaphragms and a simple fastener, such as the nut 3. In another embodiment, only one diaphragm could be used if it were provided with a distinctive coating of contrasting color on the side of the diaphragm near the bore 11c.

The present invention is not to be limited to the exact form shown in the drawings, for changes are obviously possible within the scope of the following claims.

I claim:
1. A pressure indicator comprising:
 (a) a body;
 (b) outer diaphragm means of thin elastic material having a relatively lesser degree of translucency when deflated and a greater degree of translucency when inflated, said means overlying the body and normally reposing near thereto when deflated;
 (c) indicating means between the body and the diaphragm means and having distinctive visual characteristics which are substantially hidden by the diaphragm means when deflated and less translucent;
 (d) means to introduce fluid pressure between the body and the diaphragm means to inflate the latter and increase its translucency; and
 (e) a transparent dome attached to the body and covering the diaphragm means in spaced relation thereto when deflated.

2. In an indicator as set forth in claim 1, said diaphragm means comprising colored soft rubber film means the color of which is relatively opaque when deflated and relatively translucent when inflated.

3. A pressure indicator comprising:
 (a) a body having a bore therethrough;
 (b) means to introduce pressure into said bore;
 (c) elastic diaphragm means of relatively lesser transluency when deflated and of greater transluceny when inflated overlying the bore and normally lying against the body when deflated; and
 (d) indicating means of distinctive visual characteristics located between the diaphragm means and the body;
 (e) a dome attached to the body and having transparent walls covering the diaphragm means in spaced relation thereto when said means is deflated, and the dome walls being so shaped and located with respect to the diaphragm means that the latter cover the transparent walls when the diaphragm means is inflated toward the dome by pressure introduced into the bore, and the walls having vent means therethrough to vent air between the diaphragm means and the walls.

4. In an indicator as set forth in claim 3, said means to introduce pressure comprising tubular means sized to fit snuggly in said bore.

5. A pressure indicator comprising:
 (a) a body having a bore therethrough;
 (b) hollow bushing means receivable in said bore to introduce pressure thereinto;
 (c) two elastic diaphragms of different colors overlying the bore opposite the bushing means and normally lying against the body when deflated, the outer of the diaphragms comprising a thin rubber film which is substantially less translucent when deflated than when inflated and
 (d) a transparent dome attached to the body and covering the diaphragms in spaced relation thereto when they are deflated, the dome having a vent therein through which air can escape when the diaphragms are inflated toward the dome by pressure introduced into the bore, and the dome being large enough to permit substantial inflation of the outer diaphragm, 6. In an indicator as set forth in claim 5, said bushing means comprising a hollow stud having a shoulder thereon and having a tubular portion extending beyond the shoulder in both directions, and fastener means around the tubular portion opposite the shoulder.

7. A pressure indicator comprising:
 (a) a resilient body having a bore therethrough including a restricted diameter portion of the bore;
 (b) hollow bushing means receivable in said bore and having a shoulder to catch upon said restricted diameter portion, the bushing means serving to introduce pressure into said bore;
 (c) two rubber diaphragms of different colors overlying the face of the body across the bore and normally lying against that face of the body when deflated, the diaphragms also lying against the sides of the body extending in the direction of the bore, and the outer diaphragm comprising a thin film which is substantially less translucent when deflated than when inflated; and
 (d) a dome member shaped to overlie the sides of the body and squeezing the diaphragms thereagainst in fixed relation thereto and having a transparent dome portion covering the said face of the body and the diaphragms in spaced relation thereto when the latter are deflated, the dome portion being large enough to permit substantial inflation of the diaphragms and having a vent therein through which air can escape when the diaphragms are inflated outwardly against the dome by pressure introduced into the bore.

8. In an indicator as set forth in claim 7 for mounting through a hole in a panel, said bushing means comprising a hollow stud having a flange therearound and having a tubular portion extending beyond the flange in both directons, and fastener means around one of said tubular portions to tighten the flange against the panel, and the other tubular portion being sized to fit snuggly in said bore and including said shoulder.

References Cited by the Examiner
UNITED STATES PATENTS

| | | | |
|---|---|---|---|
| 1,265,676 | 5/1918 | Klump | 73—406 |
| 2,665,580 | 1/1954 | Clawson | 116—34 |
| 3,111,930 | 11/1963 | Zipper | 116—34 |

LOUIS J. CAPOZI, *Primary Examiner.*